US006621185B2

(12) United States Patent
Riess

(10) Patent No.: US 6,621,185 B2
(45) Date of Patent: Sep. 16, 2003

(54) STATOR DEFLECTOR APPARATUS AND METHOD THEREFOR

(75) Inventor: Brian Riess, Lake in the Hills, IL (US)

(73) Assignee: SPX Corporation, Charlotte, NC (US)

( * ) Notice: Subject to any disclaimer, the term of this patent is extended or adjusted under 35 U.S.C. 154(b) by 57 days.

(21) Appl. No.: 09/828,939

(22) Filed: Apr. 10, 2001

(65) Prior Publication Data

US 2002/0145342 A1 Oct. 10, 2002

(51) Int. Cl.[7] .......................... H02K 9/19; H02K 9/193
(52) U.S. Cl. ................................ 310/54; 310/52
(58) Field of Search .................... 239/145; 310/54, 310/52; 417/366, 367; 123/196 AB

(56) References Cited

U.S. PATENT DOCUMENTS

| | | | | |
|---|---|---|---|---|
| 1,269,909 A | * | 6/1918 | Cooper | 310/54 |
| 2,959,696 A | * | 11/1960 | Tupper et al. | 310/90 |
| 3,648,085 A | * | 3/1972 | Fujii | 310/54 |
| 3,750,951 A | * | 8/1973 | Perl | 134/186 |
| 4,055,370 A | * | 10/1977 | Cunningham | 310/90 |
| 4,545,742 A | * | 10/1985 | Schaefer | 417/366 |
| 4,584,865 A | * | 4/1986 | Hutchins | 324/700 |
| 4,600,848 A | * | 7/1986 | Sutrina et al. | 310/211 |

FOREIGN PATENT DOCUMENTS

| | | | | |
|---|---|---|---|---|
| JP | 04-214969 | * | 5/1992 | F04B/39/00 |

\* cited by examiner

Primary Examiner—Burton S. Mullins
(74) Attorney, Agent, or Firm—Baker & Hostetler LLP

(57) ABSTRACT

A stator deflector assembly for an electric motor includes a plastic deflector formed to conform to a shape of the stator, an absorbent media envelope supported by the deflector, and a holding mechanism for holding the absorbent media envelope at least partially against the deflector. The absorbent media envelope is wrapped over the deflector, and the holding mechanism includes cotter pins inserted into protrusions having recesses which are formed on the deflector, and heat-staked pins which are melted against the absorbent media envelope. A wire is looped through the heads of the cotter pins to remove them after the stator deflector assembly is inserted into the motor housing. In another embodiment, the holding mechanism is an adhesive. Coolant is injected from the motor over and deflected over and absorbed by the absorbent media envelope, and passed through holes in the absorbent media envelope and deflector, to cool the stator windings.

9 Claims, 8 Drawing Sheets

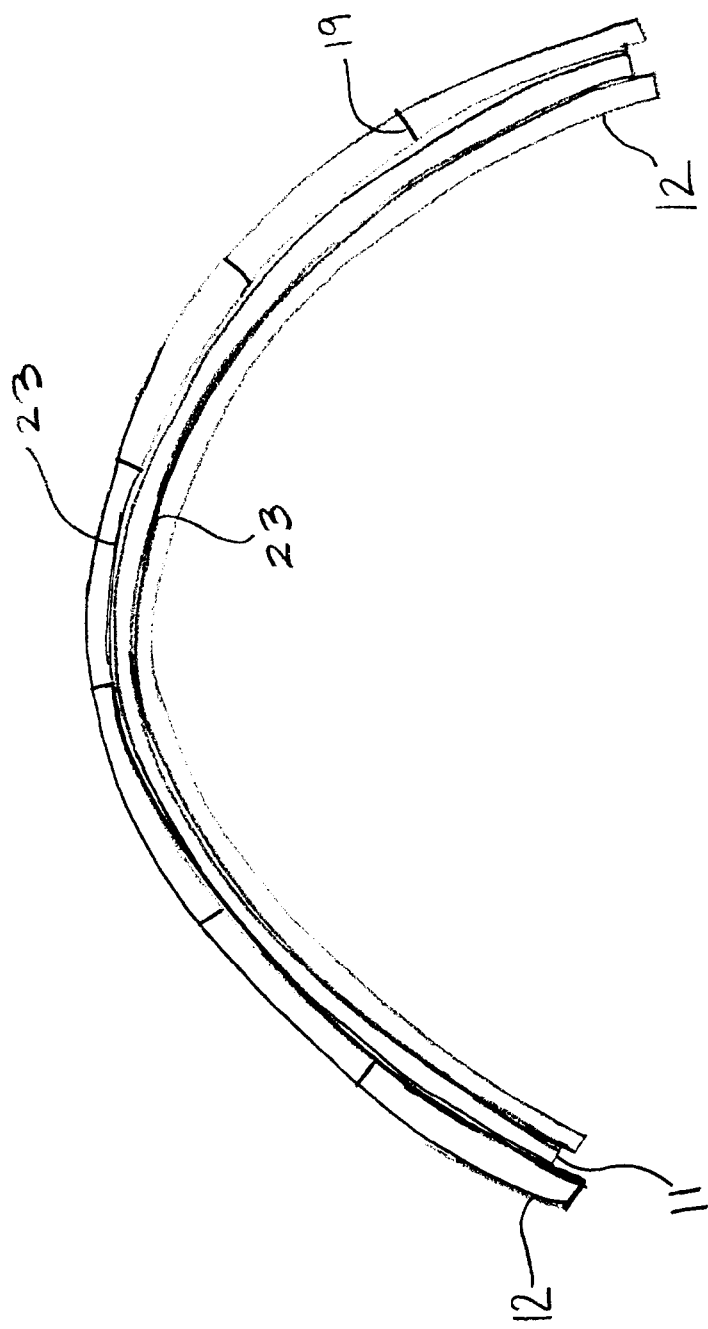

STATOR DEFLECTOR APPARATUS AND METHOD THEREFOR

FIELD OF THE INVENTION

The present invention relates to a stator deflector apparatus for deflecting coolant liquid injected from an electric motor over the windings of a stator of the electric motor, and to a method of assembling the stator deflector apparatus.

BACKGROUND OF THE INVENTION

In general, prior art electric motors include a rotatable rotor and a fixed stator. Stators are normally formed of a series of thin, flat plates stacked to form a solid body. Coils or windings are positioned in pre-formed slots in the plates, extending through the stack, with ends of the coils looping at each end of the stack to form end turns. The stator is normally cooled by air blowing through passages in the stator. Coolant in the form of oil injected from the motor, has also been used to cool the stator windings. However, the oil has often been misdirected and the stator windings have not been sufficiently cooled by this method.

Further, recent technological advances in electric hybrid motors, primarily for use in automobile manufacturing, have highlighted the problem where the stator windings of the electric hybrid motors have become very hot, and conventional cooling methods have been insufficient to cool down the motors. In particular, as stated above, the oil injected from the electric hybrid motor and used to cool the stator windings has not been directed appropriately to the stator windings, and have proven insufficient in cooling the stator windings.

SUMMARY OF THE INVENTION

Accordingly, an object of the present invention is to provide a stator deflector assembly which can cool the windings of a stator of an electric motor, in particular an electric hybrid motor, without a marked increase in complexity and in cost.

To this end, the present invention includes a stator deflector assembly having a deflector formed to conform to a shape of the stator; a fluid retaining and deflecting mechanism supported by the deflector; and a holding mechanism which holds the fluid retaining and deflecting mechanism at least partially against the deflector.

The fluid retaining and deflecting mechanism is an absorbent media envelope, which is a layered rolled felt in a preferred embodiment, and the felt is wrapped over the deflector.

The holding mechanism includes cotter pins which secure the felt to the deflector by inserting the cotter pins into protrusions having recesses therein, which are molded with the deflector. Also, the holding mechanism includes heat-staked pins which are also molded with the deflector, and which protrude through the wrapped felt and are melted against the felt to secure the felt to the deflector.

In a second embodiment of the present invention, the heat-staked pins and cotter pins are replaced by an adhesive, which at least partially adheres the felt to the deflector.

In a method of assembling the apparatus for cooling the windings of a stator, the steps include molding the deflector into a shape which corresponds to a shape of the stator; folding a fluid retaining and deflecting mechanism over the deflector; adhering the fluid retaining and deflecting mechanism at least partially to the deflector; and positioning the stator deflector assembly onto the stator in the electric motor.

As stated above, the fluid retaining and deflecting mechanism is an absorbent media envelope, which is a layered rolled felt in a preferred embodiment, and the holding mechanism includes cotter pins which secure the felt to the deflector, and heat-staked pins which are also molded with the deflector.

The adhering step includes heat-staking pins disposed on the deflector against the fluid retaining and deflecting mechanism; and inserting pins through recesses within protrusions protruding from the deflector, to hold the fluid retaining and deflecting mechanism against the deflector. The adhering step also includes using an adhesive, to adhere the fluid retaining and deflecting mechanism at least partially against the deflector.

Once the assembled stator deflector apparatus is placed in the motor housing, a wire which is disposed through the heads of the cotter pins, is pulled, such that all the cotter pins are removed and the felt is released from the surface of the deflector. Thus, the stator deflector assembly is able to catch the coolant using the felt, as the coolant is injected from the motor over the stator windings. The coolant is soaked into the felt and seeps through holes in the felt to the deflector, successfully soaking the stator windings of the motor. Thus, the task of cooling the stator windings, which ensures that the electric motor operates within a safe temperature range, is achieved.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Additional features, details, and advantages of the invention, will become evident from the following description and the drawing, wherein:

FIG. 8 is a perspective view of the stator deflector assembly according to a second embodiment of the present invention.

DETAILED DESCRIPTION OF THE PREFERRED EMBODIMENTS

The present invention, as disclosed in the following description, includes a stator deflector assembly, which deflects coolant fluid injected from an electric motor, in particular an electric hybrid motor, onto the stator windings of the motor, in order to cool the stator windings.

Figure 1:
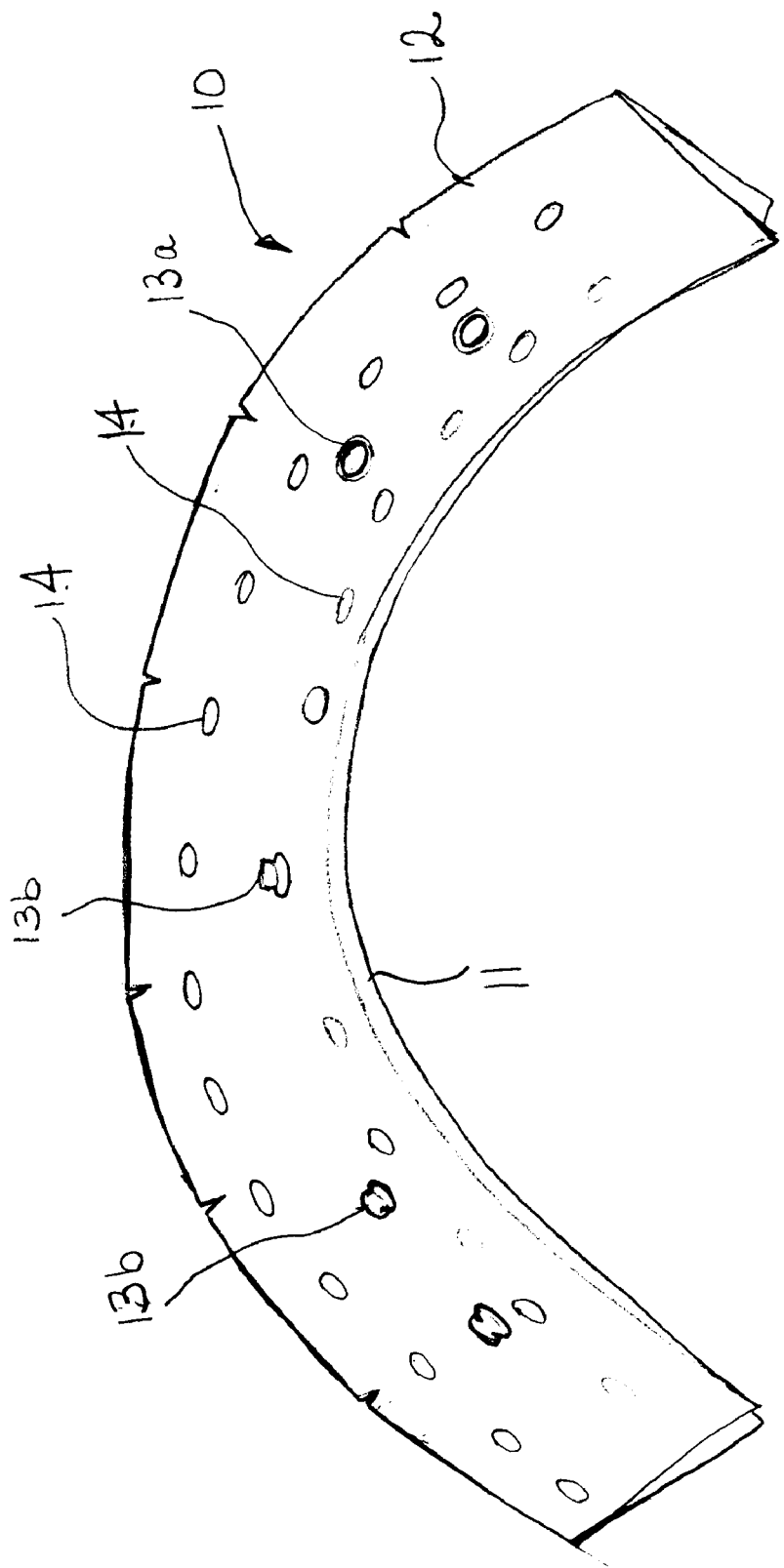
FIG. 1 is a perspective drawing of the inner side of the completed stator deflector assembly according to a first embodiment of the present invention.

The stator deflector assembly 10 in a first embodiment, as shown in FIG. 1, includes a perforated plastic stator support module (or deflector) 11 formed to fit the semi-circular design of the stator 24 (see FIG. 9) for an electric motor, and which is enclosed in an absorbent media envelope 12. The absorbent media envelope 12 is attached to the deflector 11 on an inner side by heat-staked pins 13a, 13b. The heat-staked pins 13a, 13b (13a showing after heat-staking, and 13b before heat-staking) hold the absorbent media envelope 12 in place on the inner side of the deflector 11. The absorbent media envelope 12, has holes 14 through which the coolant (i.e., oil), which is injected from the motor, passes to the windings of the stator 24 to cool the stator 24 (see FIG. 9). The absorbent media envelope 12 also soaks up the oil to cool the stator 24.

Figure 2:
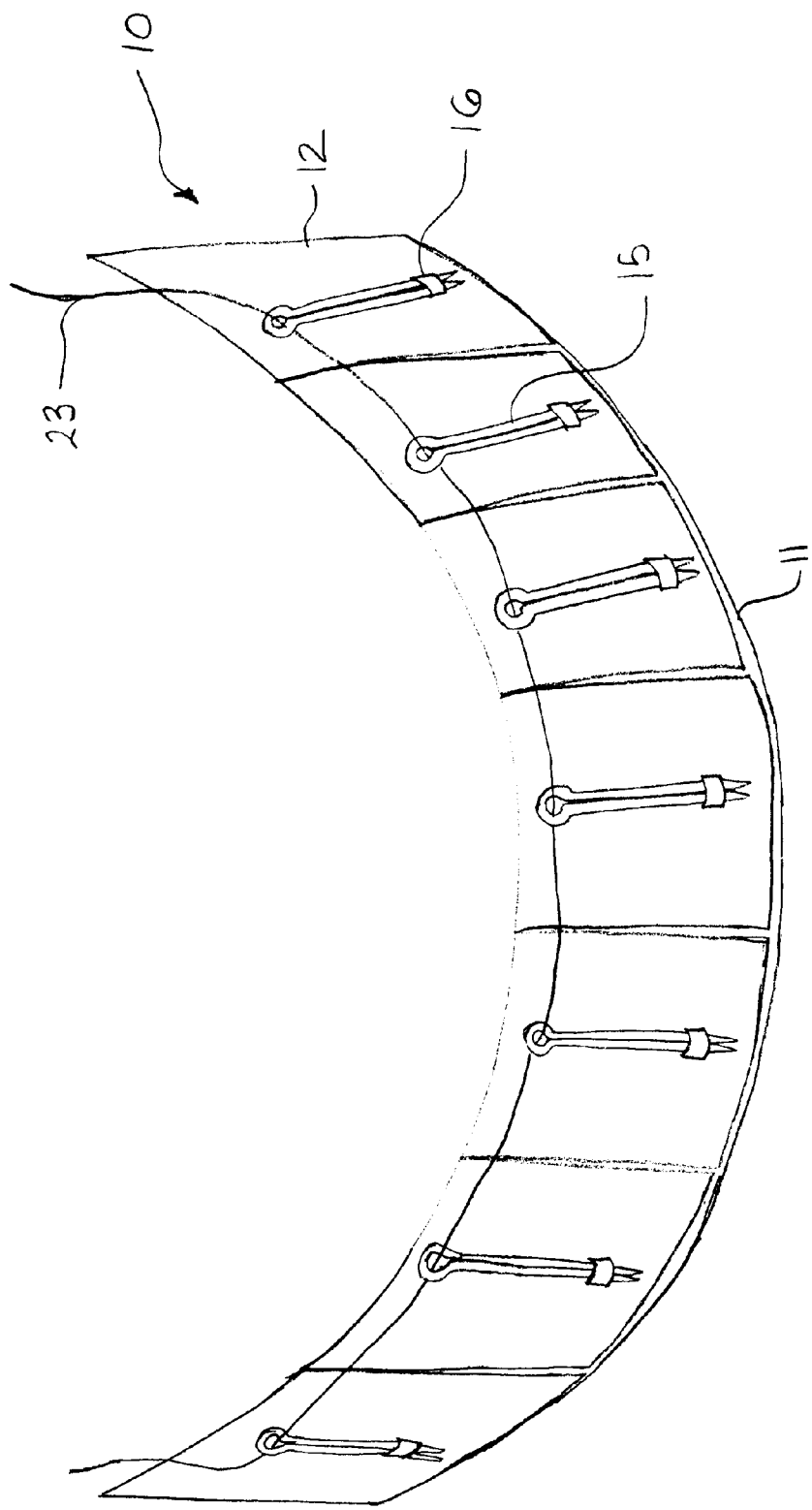
FIG. 2 is a perspective drawing of the outer side of the completed stator deflector assembly according to a first embodiment of the present invention.

The other, outer side of the deflector 11, which is shown in FIG. 2, includes raised protrusions 16 having recesses therein, which protrude through holes 17 (see FIG. 3) in the absorbent media envelope 12. Cotter pins 15 are inserted through the protrusions 16 to hold the felt media envelope 12 securely on the plastic deflector 11. However, the cotter pins 15 are optional and need not be included.

As shown in FIG. 2, the absorbent media envelope 12 is slitted on the outer side of the deflector 11 in order to more closely adhere to the semi-circular shape of the deflector 11 without ripples being formed in the material of the absorbent media envelope.

Figure 3:
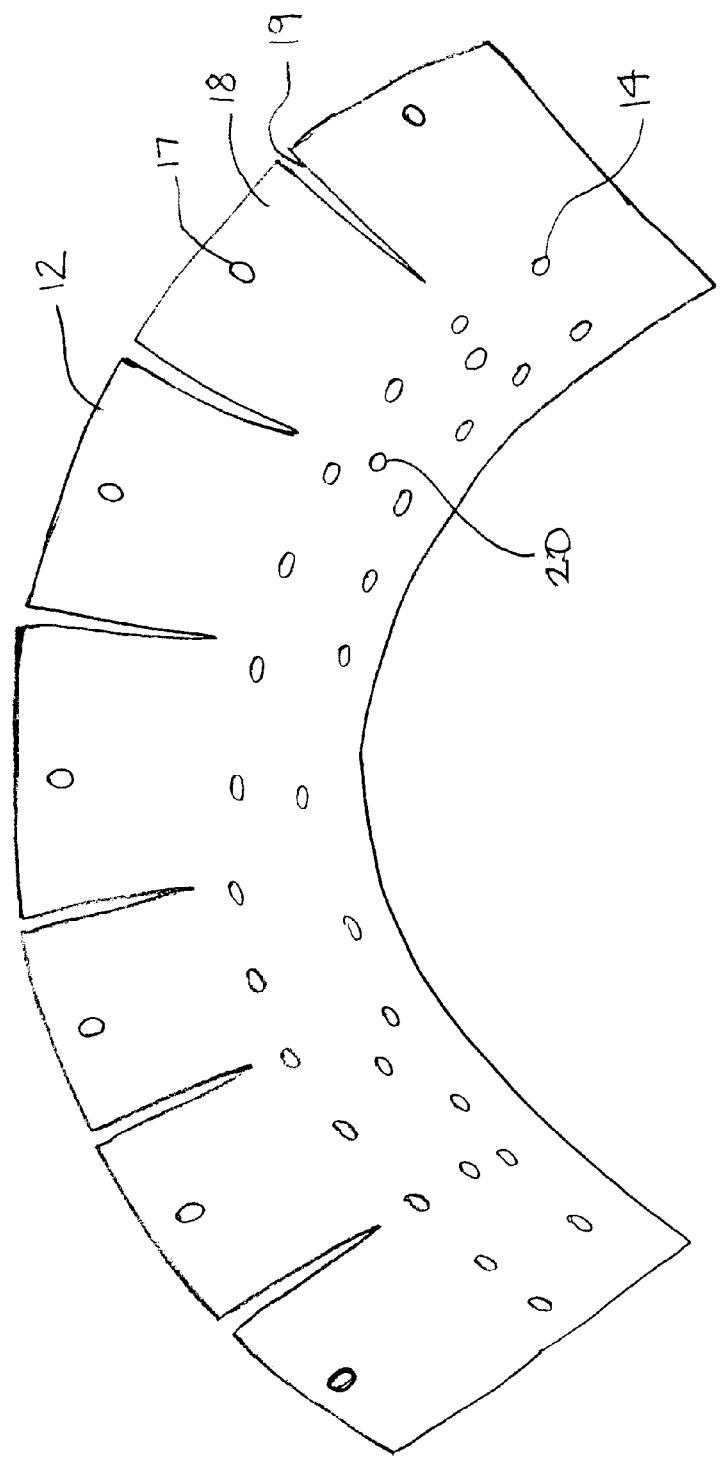
FIG. 3 is a plan view of one embodiment of the absorbent media envelope.

The absorbent media envelope 12, as shown in FIG. 3, is a single piece of material which is cut using a cutting die into the appropriate predetermined shape—one example of which is shown in FIG. 3. The absorbent media envelope 12 must be able to withstand high temperatures due to its placement in the electric motor. The absorbent media envelope 12, in a preferred embodiment, is made of a layered rolled felt material.

The absorbent media envelope 12 is slitted on one side half of the material along its axis of curvature where it is folded in half over the deflector 11. There are holes 17 in each of the flap portions 18 caused by the slits 19, such that the protrusions 16 on the deflector 11 can be inserted through the holes 17 and the cotter pins 15 inserted in the protrusions 16, to hold the absorbent media envelope 12 in place on the deflector 11.

A plurality of holes 14 are disposed on the other side half of the absorbent media envelope 12 opposing the flap portions 18, such that the coolant can enter the holes 14 to reach the windings of the stator 24. There are also a plurality of holes 20 disposed at various positions paralleling the axis of curvature of the absorbent media envelope 12, through which the ends of the heat-staked pins 13a, 13b on the deflector 11 protrude in order to be heat-staked on the absorbent media envelope 12.

It is apparent that any number of holes 14 for the coolant can be used in the absorbent media envelope 12, as there can be any number of holes 20 for the heat-staked pins 13a, 13b, and that the positions of those holes 14 and 20 can be at any appropriate location in the absorbent media envelope 12, as long as they achieve the objective of cooling the stator windings by allowing the coolant to seep therethrough. Further, the slits 18 can be any number of slits, and the holes 17 for the cotter pins 15 can also be of any appropriate number, and are not limited to the seven holes 17 and seven cotter pins 15 shown in FIGS. 2 and 3. Further, the holes 17 and cotter pins 15 can be positioned at any appropriate position.

Figure 4:
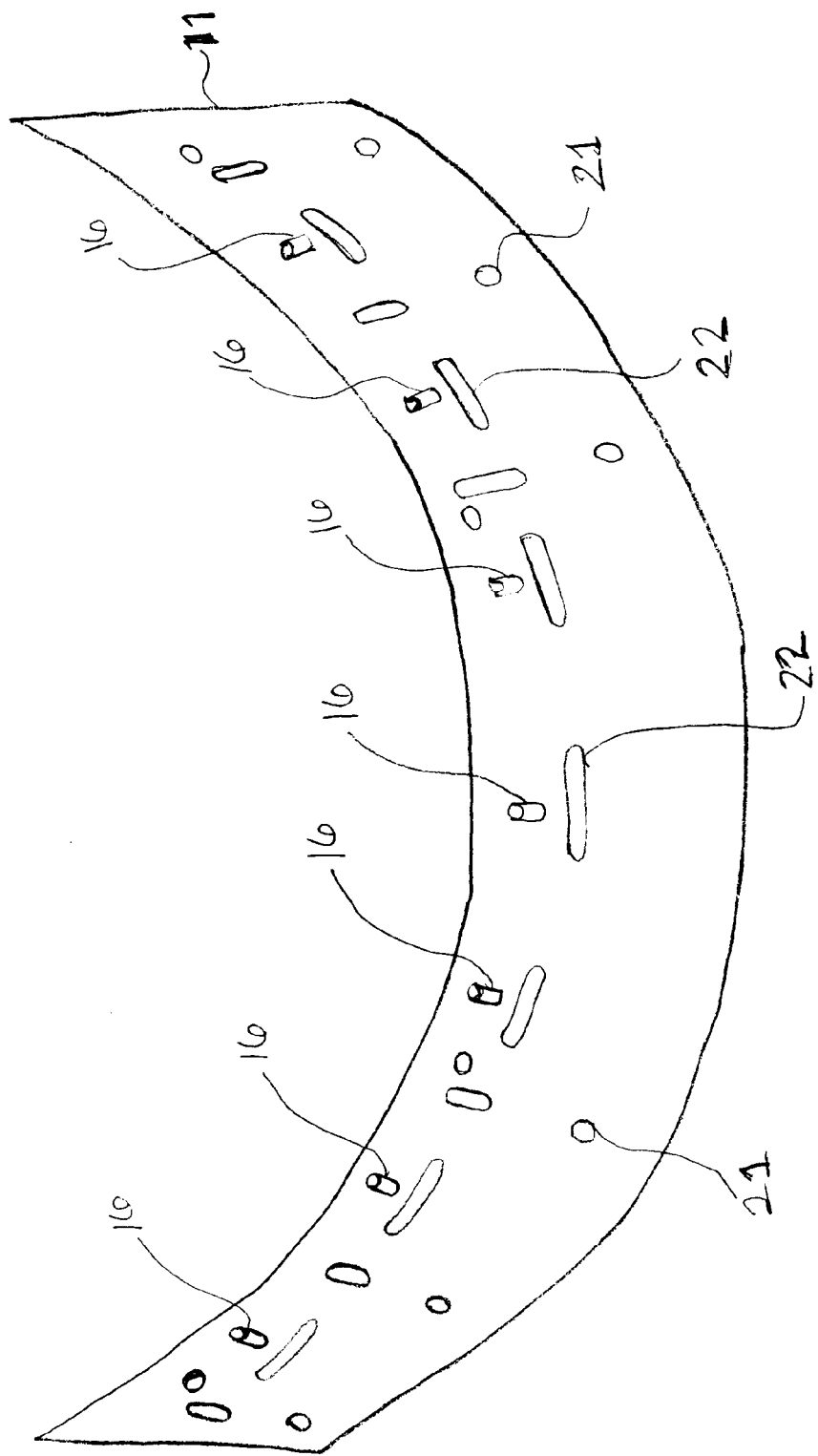
FIG. 4 is a perspective drawing of the outer side of the deflector according to a first embodiment of the present invention.
Figure 6:
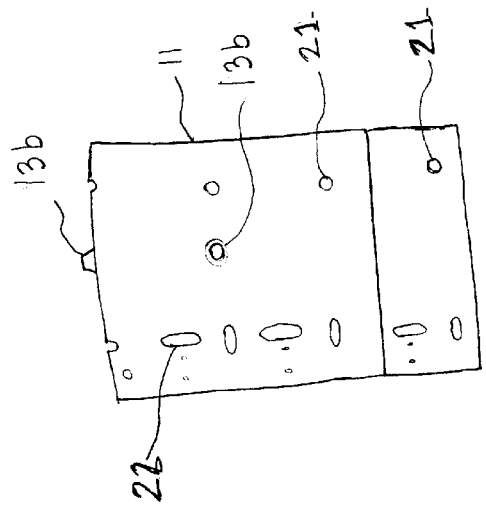
FIG. 6 is a side view of the tilted deflector according to a first embodiment of the present invention.

The deflector support module 11 itself is made of injection-molded plastic, the plastic being of any appropriate plastic material which can withstand high temperatures due to its placement in the electric motor. The deflector 11, as shown on its outer side in FIG. 4, is of a semi-circular shape to match the stator's curvature. The deflector 11 has raised protrusions 16 on the outer side which are injection-molded with the deflector 11 (see FIG. 6 for a side view of the tilted deflector 11 showing the protrusions 16). The cotter pins 15 are placed through these protrusions 16 when the absorbent media envelope is in place (see FIG. 2).

Figure 5:
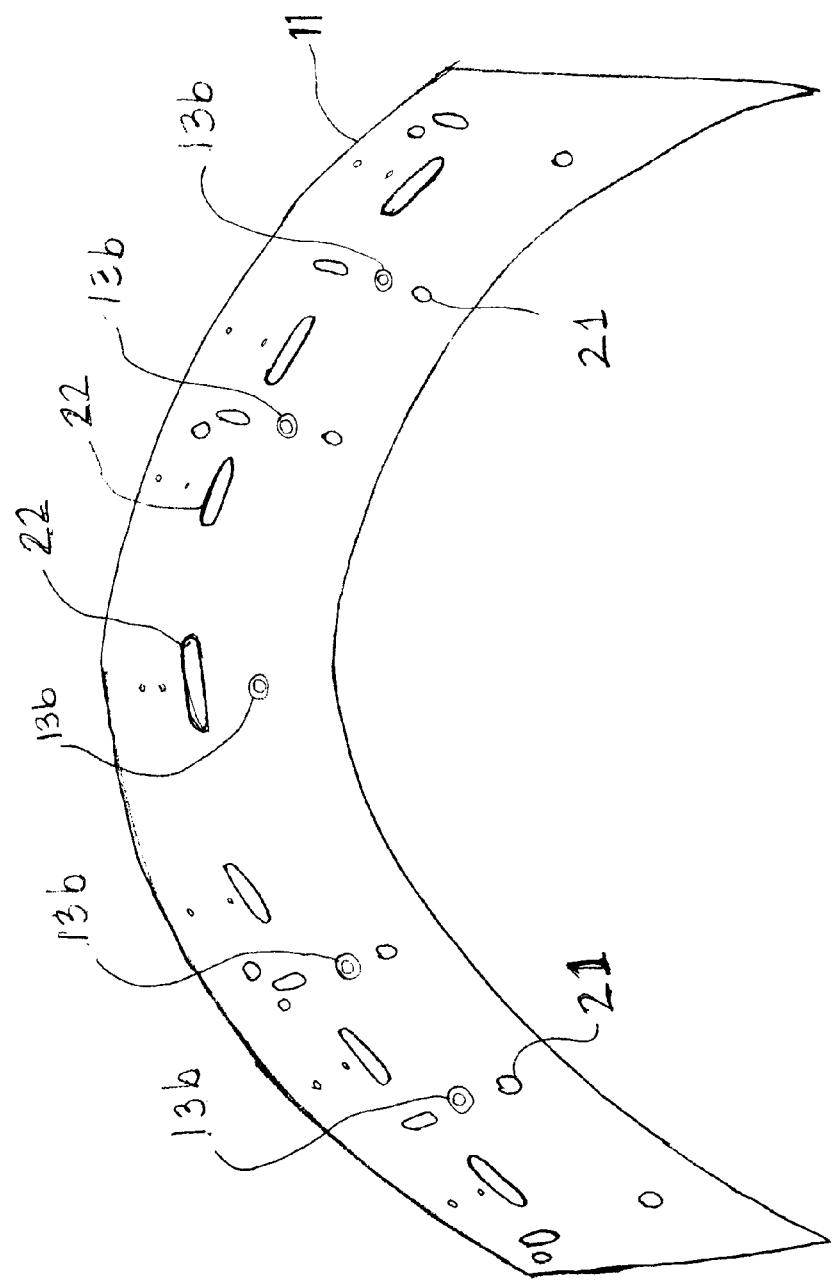
FIG. 5 is a perspective drawing of the inner side of the deflector according to a first embodiment of the present invention.

The deflector 11 also has heat staked-pins 13b (see FIG. 1) formed with the deflector 11 by injection-molding, on the inner side of the deflector 11 (see FIG. 5). The heat-staked pins 13a, 13b protrude through the holes 20 in the absorbent media envelope 12 to hold the absorbent media envelope 12 in place against the deflector 11 (see FIG. 2). A plurality of holes 21 and slits 22 formed in the deflector 11, in a major part, substantially align with holes 14 in the absorbent media envelope 12 to allow coolant to enter the assembly 10 and flow over and cool the windings of the stator 24.

It is readily apparent that the deflector 11 can have the protrusions 16, heat-staked pins 13b, holes 21, and slits 22, disposed at any location, as long as the protrusions 16 and heat-staked pins 13b align with the holes 17 and holes 20, respectively, of the absorbent media envelope 12. Further, the holes 21 and slits 22 can be disposed at any location in the deflector 11 as long as they substantially allow the coolant to flow over the stator windings after entering through holes 14 of the absorbent media envelope 12.

Once assembled, a wire 23 or other material is passed through the loops at the head of the cotter pins 15 (see FIG. 1). When the stator deflector assembly 10 is installed in the automobile housing, the wire 23 is pulled so that the cotter pins 15 are removed, and the absorbent media envelope 12 is released from the surface of the deflector 11 on the outer side of the deflector 11, and thus, can catch any soak up any coolant fluid and deflect the coolant over the stator windings (see FIG. 9 for the stator deflector assembly 10 assembled on a stator 24).

The method of assembly of the present invention includes cutting the absorbent media envelope 12 to the appropriate size and predetermined shape, as exemplified in FIG. 3, using a cutting die. The deflector 11 is injection-molded and formed with protrusions 16, holes 21, slits 23, and heat-staked pins 13b (see FIG. 1).

Figure 7:
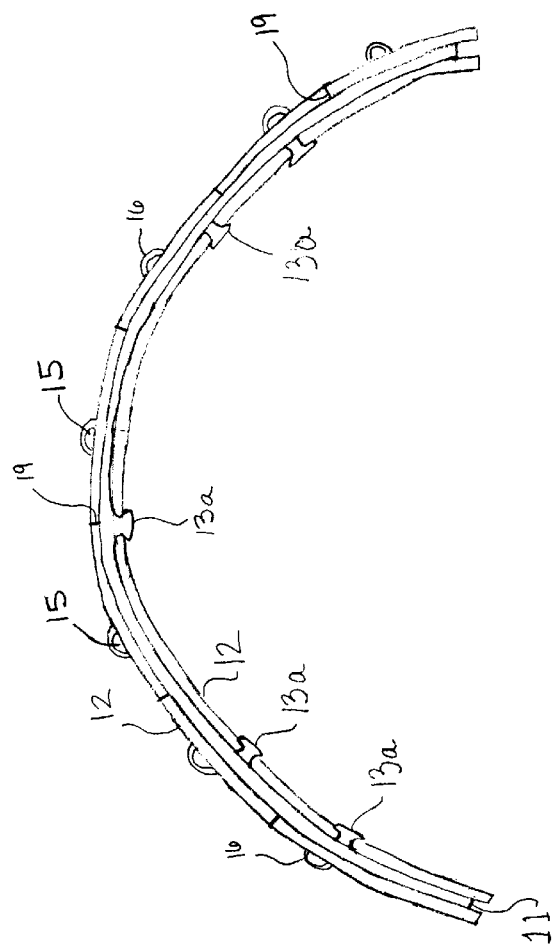
FIG. 7 is a bottom view of the stator deflector assembly according to a first embodiment of the present invention.

The cut absorbent media envelope 12, which in the preferred embodiment is a felt material 12, is then wrapped or folded in half over the deflector 11. The heat-staked pins 13b protrude through the holes 20 in the felt material 12 on the inner side of the module 11 (see FIG. 1). The heat-staked pins 13b are then heat-staked, such that the protruding pins 13b are melted and adhere to the felt 12 (see pins 13a in FIG. 1), keeping the felt 12 in position on the inner side of the deflector 11 (see FIG. 7).

The protrusions 16 protrude through the holes 17 of the felt 12 on the outer side of the deflector 11, and cotter pins 15 are passed through the recesses of the protrusions in order to hold the felt 12 in position against the side surface of the deflector 11.

In a second embodiment of the present invention, no heat-staked pins 13a, 13b or cotter pins 15 are used, and an adhesive is used to keep the felt in position against the surface of the deflector 11 (see FIG. 8). The adhesive need not be liberally applied since some movement of the absorbent media envelope 12 away from the side surface of the deflector 11 on the outer side of the deflector 11 is preferable in order to catch the coolant. Further, in this embodiment, there is also no need to injection-mold the deflector 11 with protrusions 16 or heat-staked pins 13b, nor is there any need for the plurality of holes 17 and 20 in the absorbent media envelope 12.

Figure 9:
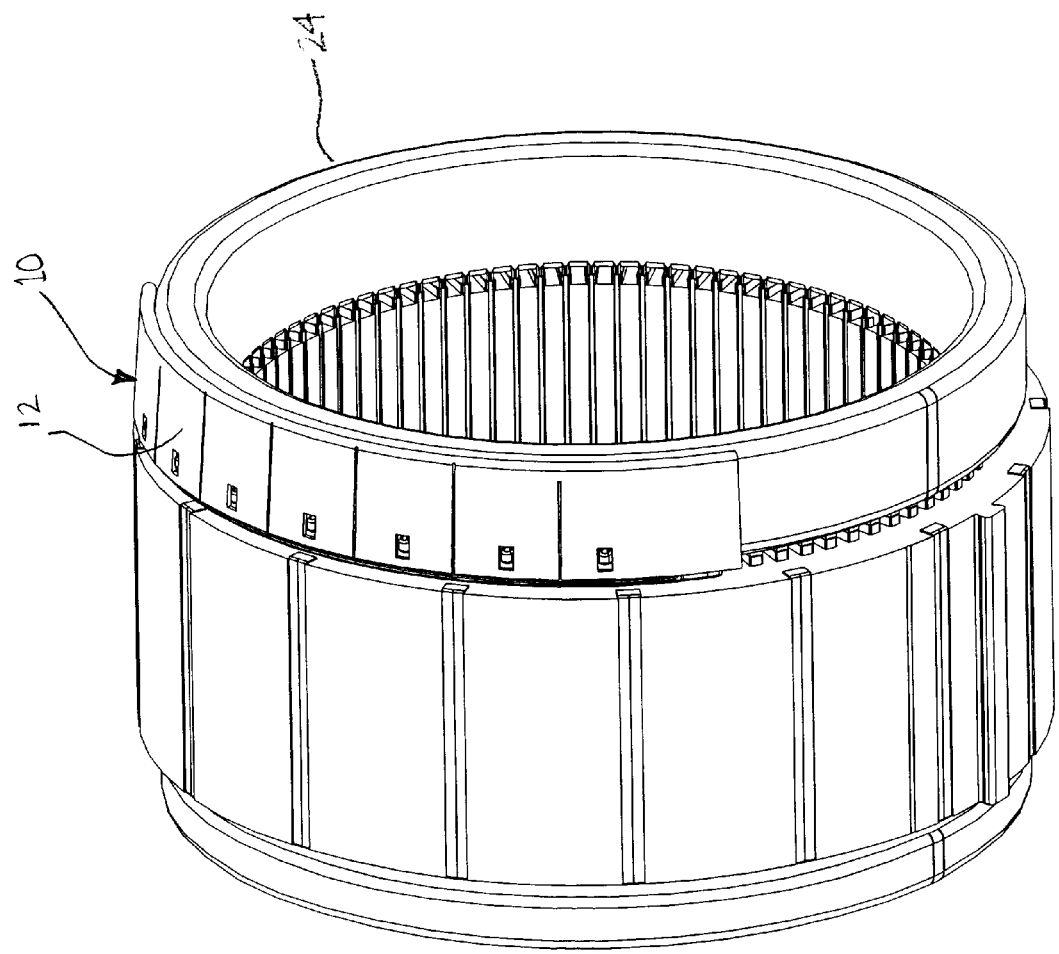
FIG. 9 is a perspective view of the stator deflector assembly according to a first embodiment of the present invention, assembled on a stator.

Once the stator deflector assembly 10 is assembled as shown in FIGS. 1 and 2, according to the first embodiment, the electric hybrid motor is placed in the housing of the automobile, and the stator deflector assembly 10 is attached through to the motor with conventionally available plastic ratchet pins (see FIG. 9). Then, the wire 23 which is passed through the loops at the heads of the cotter pins 15 (see FIG. 1) is pulled, so that the felt 12 is released from the surface of the deflector 11 on the outer side, and thus, can catch and soak up any coolant fluid which is deflected over the stator windings.

Although the stator deflector assembly 10 can be used without the wire 23, it is preferred to use the wire 23 to keep the felt 12 in position against the deflector 11 surface until the stator deflector assembly 10 is in position in the automobile housing.

Thus, the stator deflector assembly 10 catches the coolant in the absorbent media envelope 12 as the coolant is injected from the motor over the stator windings (see FIG. 9). The coolant is soaked into the absorbent media envelope 12 and seeps through to the deflector 11 inside the stator deflector assembly 10, successfully soaking the stator windings of the motor. Thus, the task of cooling the stator windings, which ensures that the electric hybrid motor operates within a safe temperature range, is achieved without complexity or substantial costs.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A deflector assembly for cooling windings of a stator, comprising:
    a deflector formed to conform to a shape of the stator;
    a fluid retaining and deflecting mechanism supported by said deflector, wherein said fluid retaining and deflecting mechanism is an absorbent media envelope; and
    a holding mechanism for holding said fluid retaining and deflecting mechanism at least partially against said deflector, wherein said holding mechanism includes at least one of heat-staked pins and cotter pins.

2. The stator deflector assembly according to claim 1, wherein said holding mechanism further comprises a plurality of protrusions disposed on said deflector, through which said cotter pins are disposed.

3. The stator deflector assembly according to claim 2, wherein said holding mechanism further comprises a plurality of heat-staked pins disposed on said deflector.

4. The stator deflector assembly according to claim 3, wherein a plurality of holes are provided in said absorbent media envelope to accommodate said heat-staked pins of said deflector.

5. The stator deflector assembly according to claim 2, wherein a removable wire is disposed through said cotter pins.

6. The stator deflector assembly according to claim 1, wherein said absorbent media envelope is a layered rolled felt.

7. The stator deflector assembly according to claim 2, wherein a plurality of holes are provided in said absorbent media envelope to accommodate said protrusions.

8. A deflector assembly for cooling windings of a stator, comprising:
    a deflector formed to conform to a shape of the stator;
    a fluid retaining and deflecting mechanism supported by said deflector, wherein said fluid retaining and deflecting mechanism is an absorbent media envelope, wherein said absorbent media envelope is a layered rolled felt, wherein said felt is folded in half over said deflector, and one half of said felt is slitted and the other side includes a plurality of holes; and
    a holding mechanism for holding said fluid retaining and deflecting mechanism at least partially against said deflector.

9. A deflector assembly for cooling windings of a stator, comprising:
    a deflector formed to conform to a shape of the stator, wherein said deflector includes a plurality of holes;
    a fluid retaining and deflecting mechanism supported by said deflector, wherein said fluid retaining and deflecting mechanism includes a plurality of holes, and said holes of said deflector substantially align with said holes of said fluid retaining and deflecting mechanism, to allow a coolant to enter said holes of said fluid retaining and deflecting mechanism and said holes of said deflector, to cool the stator windings; and
    a holding mechanism for holding said fluid retaining and deflecting mechanism at least partially against said deflector.

* * * * *